United States Patent [19]

Higashiura

[11] Patent Number: 5,306,111
[45] Date of Patent: Apr. 26, 1994

[54] APPARATUS FOR WITHDRAWING REELS FROM A PACKING CASE

[75] Inventor: Toshihiko Higashiura, Hyogo, Japan

[73] Assignee: Toyo Tire & Rubber Co., Ltd., Osaka, Japan

[21] Appl. No.: 23,661

[22] Filed: Feb. 26, 1993

[51] Int. Cl.$^5$ ............................................. B65G 60/00
[52] U.S. Cl. ................................. 414/416; 414/797.1; 414/929; 414/626
[58] Field of Search ............... 414/626, 627, 911, 908, 414/929, 416, 910, 403, 796.9, 797, 797.1, 788.8, 789.5, 795.9

[56] References Cited

U.S. PATENT DOCUMENTS

| 2,466,693 | 4/1949 | Fishcer | 414/416 |
| 2,975,911 | 3/1961 | Wedensky | 414/929 X |
| 3,215,289 | 11/1965 | Gleason | 414/929 X |
| 4,302,142 | 11/1981 | Kuhl et al. | 414/929 X |
| 4,358,236 | 11/1982 | Dudley | 414/797.1 X |
| 4,541,762 | 9/1985 | Tischler et al. | 414/416 X |
| 4,911,608 | 3/1990 | Krappitz et al. | 414/929 X |

FOREIGN PATENT DOCUMENTS

| 354873 | 2/1990 | European Pat. Off. | 414/929 |
| 2222678 | 4/1973 | Fed. Rep. of Germany | 414/797.1 |
| 2457961 | 6/1976 | Fed. Rep. of Germany | 414/416 |

Primary Examiner—Frank E. Werner
Attorney, Agent, or Firm—Jordan and Hamburg

[57] ABSTRACT

From a packing case containing a plurality of reels in plural rows and lines and in plural stages with separators interposed between adjacent stages, the reels and separators are taken out one stage after another and transferred to different locations. The apparatus generally comprises a first conveyer for conveying the case, a second conveyer for conveying the reels provided on one side of said first conveyer, a third conveyer for conveying the separators provided on the other side of said first conveyer, a first carriage adapted to travel along overhead rails between the respective overhead positions of the first and second conveyers and having reel attracting devices free to descend and ascend and a second carriage adapted to travel along the overhead rails between the respective overhead positions of the first conveyer and third conveyer and having separator attracting devices free to ascend and descend.

1 Claim, 5 Drawing Sheets

APPARATUS FOR WITHDRAWING REELS FROM A PACKING CASE

TECHNICAL FIELD

The present invention relates to an apparatus for withdrawing reels automatically from a packing case containing said reels in plural rows and lines and in plural stages with separators between adjacent stages.

PRIOR ART

In using steel cords for reinforcing car tires, a plurality of reels each carrying a winding of steel cord are set in plural rows and stages on a creel stand and the steel cords paid out from the respective reels are aligned and topped with a rubber composition. The reels are supplied as accommodated in a packing case with their axes oriented vertically, generally in 3 rows and 4 lines and in 5 stages with spacers between stages. This packing case is transported to said creel stand, where the reels are taken out from the case and set over the pins of the creel stand by hand.

However, since each reel carrying a winding of steel cord weighs about 20 kg and the height of the packing case is more than one meter, the above withdrawal operation is a painstaking and dangerous operation.

SUMMARY OF THE INVENTION

This invention provides an apparatus for withdrawing a plurality of reels automatically from a packing case containing said reels in plural rows and lines and in a plurality of stages. The principle of operation is as follows. As the packing case is positioned on a first conveyer, the reels in one stage are withdrawn on a second conveyer disposed on one side of said packing case, then the underlining separator is withdrawn on a third conveyer disposed on the side of said packing case which is opposite to the first-mentioned side and the above steps are repeated until the packing case is emptied.

As such, the apparatus of this invention comprises a first conveyer adapted to convey horizontally a packing case containing a plurality of reels in plural rows and lines and in plural stages with separators between adjacent stages, a second conveyer for conveying said reels as disposed on one side of said first conveyer and at right angles therewith, a third conveyer for conveying said separators as disposed on one side of said first conveyer which is opposite to said second conveyer, overhead rails disposed over and between said second conveyer and third conveyer, a first carriage adapted to travel back and forth along said overhead rails between the respective overhead positions of said first conveyer and second conveyer, a reel attracting means suspended from said first carriage and free to ascend and descend, a second carriage adapted to travel back and forth along said overhead rails between the respective overhead positions of said first conveyer and third conveyer, and a separator attracting means suspended from said second carriage and free to ascend and descend.

After the first carriage is positioned over the first conveyer and the second carriage over the third conveyer, a packing case containing a plurality of reels is positioned on one end of said first conveyer, the top lid of the case is removed and the packing case 1 is brought to the junction between said second and third conveyers. Then, the reel attracting means are lowered from the first carriage to hold the reels in the uppermost stage. Thereafter, said reel attracting means are raised back and the first carriage is moved to the overhead position of the second conveyer, where its reel attracting means are lowered and release the reels on the second conveyer.

While the first carriage carrying the above reels move from the overhead position of the first conveyer to the overhead position of the second conveyer, where the reel attracting means are lowered to release the reels, the second carriage is moved from the overhead position of the third conveyer to the overhead position of the first conveyer, where the separator attracting means are lowered to hold the separator in the uppermost stage. Then, in synchronism with the raising of the reel attracting means in the position over said second conveyer, the separator attracting means over the first conveyor are raised and the first carriage is moved back into the overhead position of the first conveyer, while the second carriage is moved back to the overhead position of the third conveyer. Then, the reel attracting means of the first carriage and the separator attracting means of the second carriage are lowered, whereupon the reels in the second stage are held by the reel attracting means, while the separator is released from the separator attracting means of the second carriage onto the third conveyer.

The reel attracting means carrying the reels from the second stage and the separator attracting means which have released the separator are then raised and the first carriage is moved to the overhead position of the second conveyer while the second carriage is moved to the overhead position of the first conveyer. Then, the reel attracting means of the first carriage and the separator attracting means of the second carriage are respectively lowered, whereby the reels are lowered from the reel attracting means onto the second conveyer while the separator in the second stage is held by the separator attracting means. It should be understood that before the second stage reels are released from the reel attracting means, the first-stage reels previously lowered on the second conveyer is carried away by the second conveyer to the opposite side of the first conveyer.

Thus, as the first and second carriages are simultaneously moved back and forth and the attracting means are lowered and raised in repetition, the reels in the packing case 1 are transferred one stage after another to the second conveyer, while the separators in the packing case are transferred one after another to the third conveyer. The reels are thus laid down in a single stage on the second conveyer and conveyed to the next stage, while the separators are piled up and carried away.

As described above, the apparatus of the present invention generally comprises a first conveyer for conveying the packing case, a second conveyer for conveying the reels provided on one side of said first conveyer, a third conveyer for conveying the separators provided on the other side of said first conveyer, a first carriage adapted to travel along overhead rails between the respective overhead positions of the first and second conveyers and having reel attracting means free to descend and ascend and a second carriage adapted to travel along overhead rails between the respective overhead positions of the first conveyer and third conveyer and having separator attracting means free to ascend and descend. Therefore, as a packing case containing a plurality of reels is placed on the first conveyer, the first carriage travels back and force along overhead rails between the respective overhead positions of the first and second conveyers and the second carriage travels back and forth between the respective overhead positions of the first and third conveyers. In the course, the reel attracting means and separator attracting means are respectively lowered and raised in such a manner that the reel attracting means take out the reels one stage after another from the packing case and serially lower them on the second conveyer, while the separator attracting means take out the separators one after another from the packing case and serially lower them onto the third conveyer.

Therefore, the subsequent handling of reels is greatly facilitated. As described specifically hereinafter, the reels on the second conveyer can be easily transferred to the horizontal forks arranged in parallel on a carriage or transport car so that the setting of the reels of steel cords on the creel stand for rubber topping can be automated.

DETAILED DESCRIPTION OF THE PREFERRED EMBODIMENT

Figure 1:
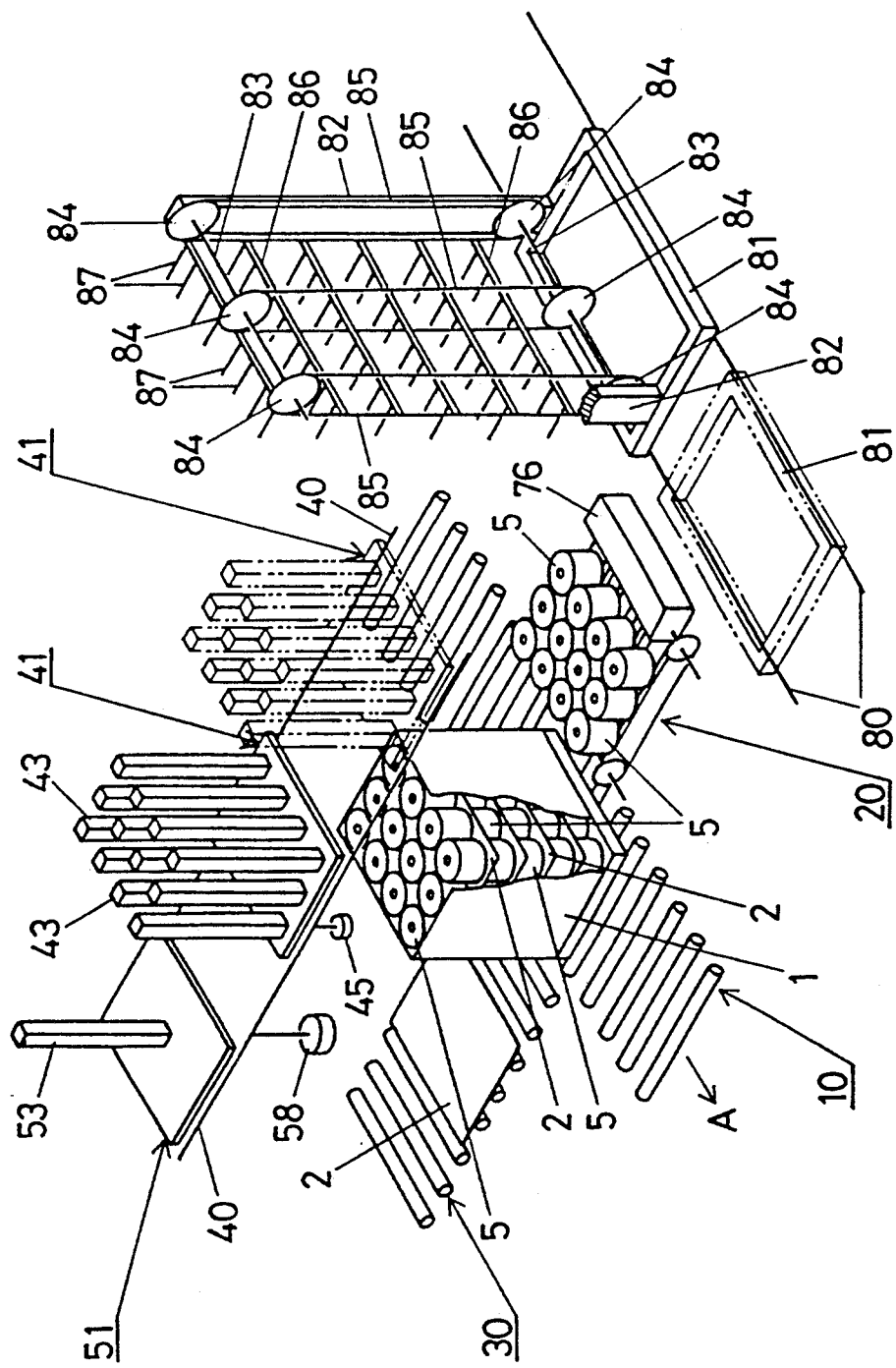
FIG. 1 is a schematic perspective view showing an embodiment of the invention.
Figure 3:
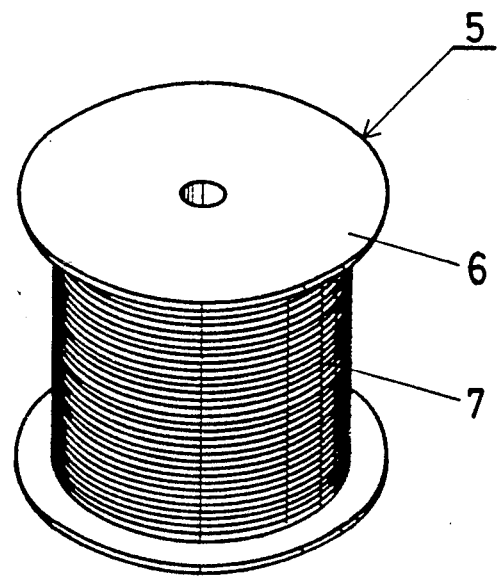
FIG. 3 is a perspective view of the reel.

Referring to FIG. 1, the packing case 1 in the form of a box contains a total of 60 reels in 5 stages, 12 reels in 4 rows and 3 lines per stage, with separators 2 interposed between adjacent stages. As illustrated in FIG. 3, the reel 5 is formed with a pair of flanges 6 and carrying a winding of steel cord 7 between the flanges 6.

Figure 2:
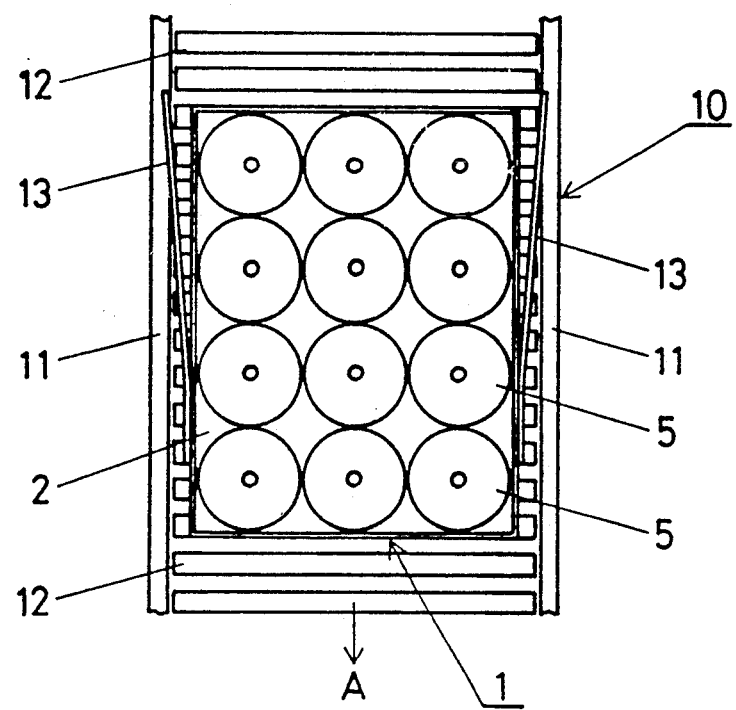
FIG. 2 is a plan view showing a part of the first conveyer.

As shown in FIG. 2, a first conveyer 10 on which said packing case 1 is positioned comprises a pair of lateral frames 11, 11 and a multiplicity of rollers 12 and is equipped, at the loading end thereof, with a centering guide 13 comprising a pair of bars juxtaposed to taper the path in the direction of advance (arrow-mark A) of the packing case 1 so that when the packing case 1 positioned on the first conveyer 10 is transported from right top to left down as indicated by arrowmark A in FIG. 1, the packing case 1 is automatically urged toward the centerline of the first conveyer 10.

As shown in FIG. 1, there is disposed a second conveyer 20 for transporting said reels 5 on the right-hand side of said first conveyer 10 at right angles therewith and a third conveyer 30 for transporting said separators 2 on the opposite or left side of said first conveyer 10 at right angles therewith. Disposed over and between said second conveyer 20 and third conveyer 30 is an overhead track consisting of two rails 40 and 40 and a first carriage 41 for transporting said reels 5 and a second carriage 51 for transporting said separators 2 are disposed on said rails 40, 40.

Figure 4:
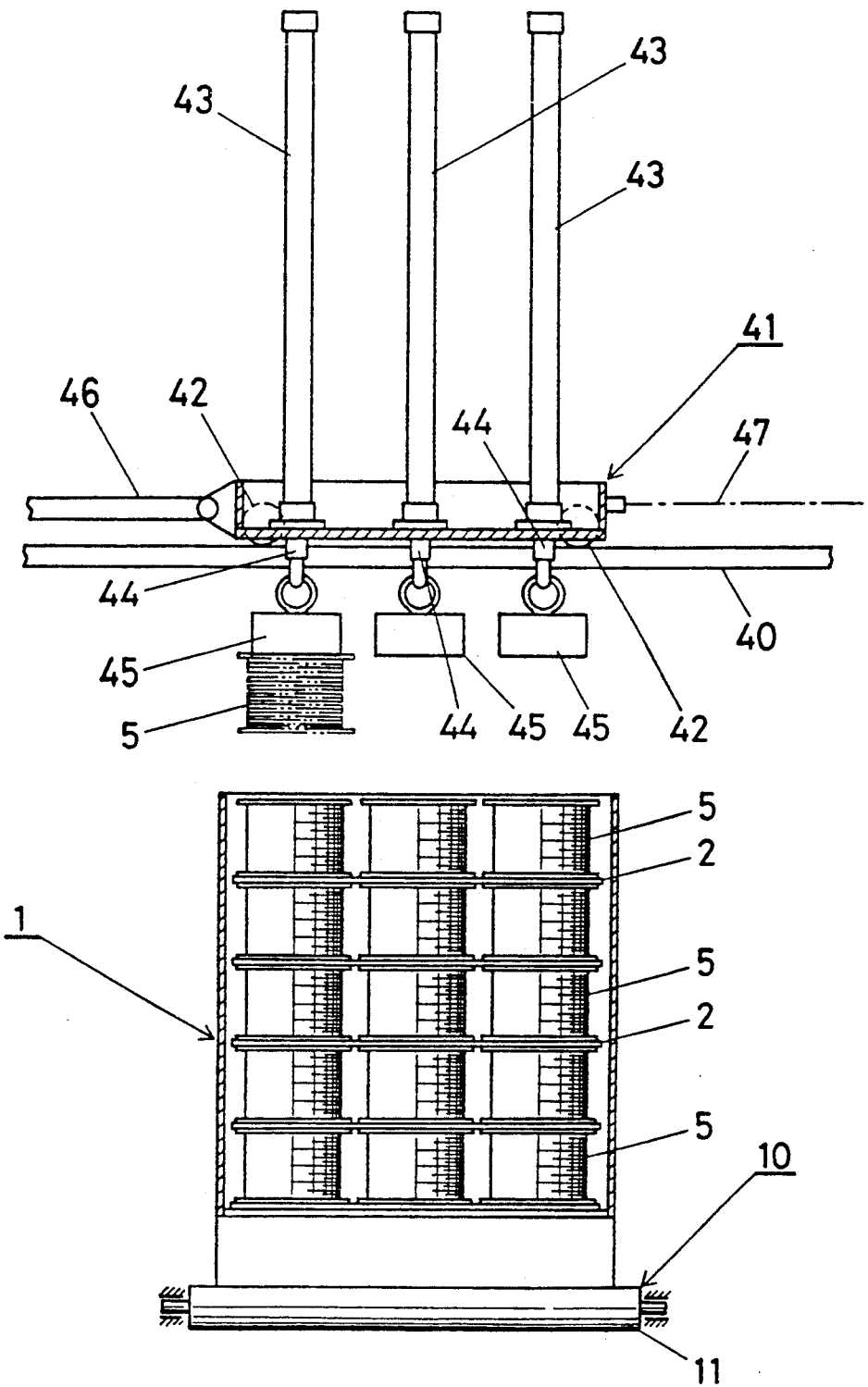
FIG. 4 is a longitudinal section view showing the first carriage and the packing case on the first conveyer.

As shown in FIG. 4, the first carriage 41 is box-shaped and mounted on said rails 40 through wheels 42 attached to its four corners. Mounted on this first carriage 41 are a total of 12 first air cylinders 43 in a pattern of 3 rows and 4 lines corresponding to the arrangement of reels 5 in said packing case 1 and a magnet 45 as reel attracting means is suspended from the end of a downward piston rod 44 of each air cylinder 43. As an alternative, it is possible to employ one large-sized first air cylinder 43 for lowering or raising said 12 magnets.

Figure 5:
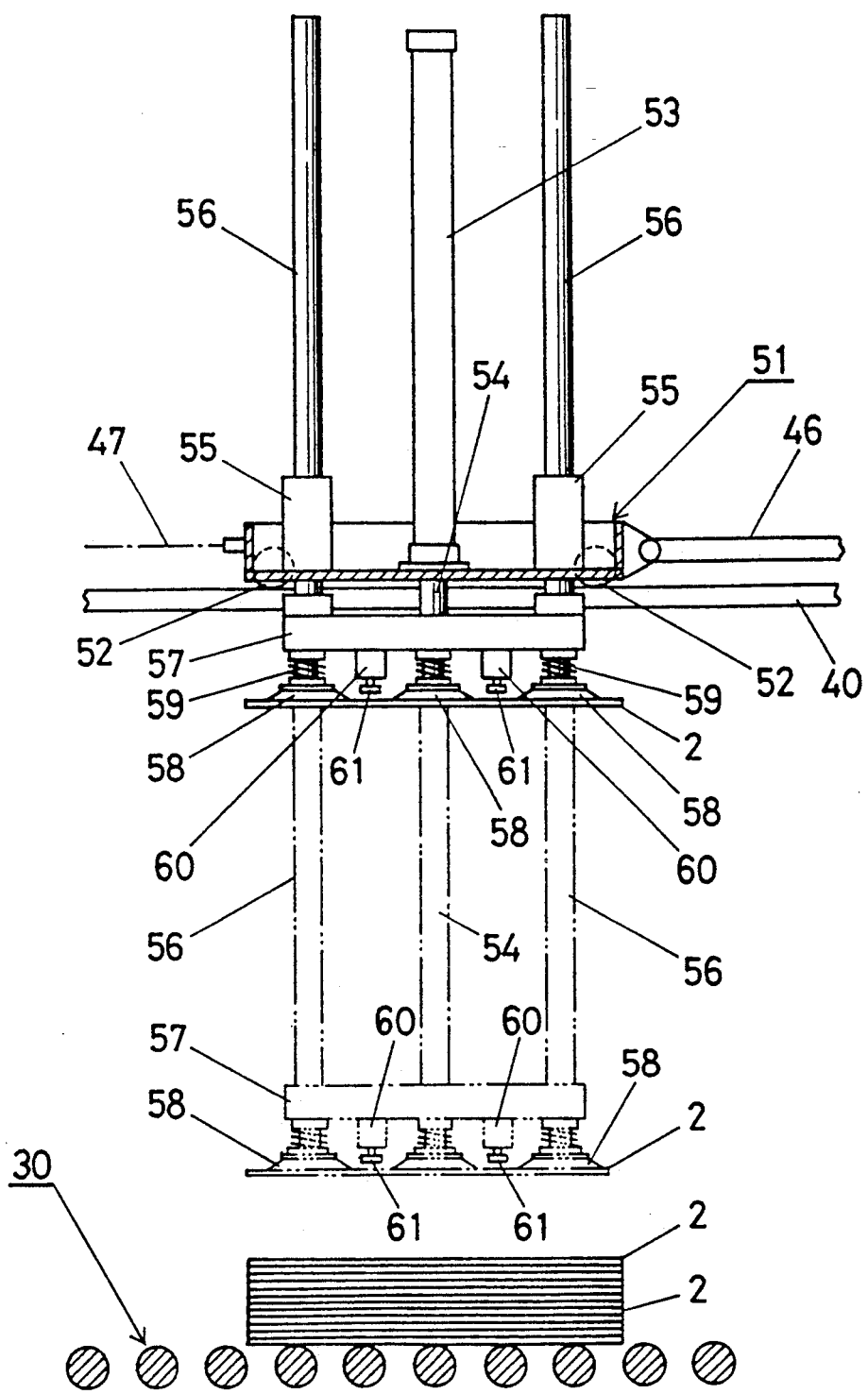
FIG. 5 is a longitudinal section view showing the second carriage and the third conveyer.

The second carriage 51 (FIG. 5) is connected to the rear end (left end in FIG. 4) of said first carriage 41 through a connecting rod 46 and while one end of a transmission chain 47 is connected to the front end of said first carriage 41, the other end of said chain 47 is connected to the rear end of said second carriage 51 so that said first carriage 41, connecting rod 46, second carriage 51 and transmission chain 47 form a closed loop. In this arrangement, as the transmission chain 47 is driven in the normal or reverse direction by a motor through chain sprockets (not shown), said first carriage 41 and second carriage 51 are caused to travel simultaneously on the overhead rails 40, 40.

The second carriage 51 is also box-shaped like the first carriage 41 and is mounted on said rails 40, 40 through wheels 52 attached to its four corners. Disposed centrally on this second carriage 51 is a second air cylinder 53 and forwardly and backwardly of said second air cylinder 53, are vertical guides 55, 55. The lower end of a downwardly projecting piston rod 54 of said second air cylinder 53 and the lower ends of lift rods 56, 56 extending through said vertical guides 55, 55, respectively, are connected to an underlying lift plate 57. Attached to the underside of said lift plate 57 through compression springs 59 are a plurality of vacuum pads 58 connected to a vacuum pump (not shown) for attracting said separator 2, while a small third air cylinder 60 for detaching the separator held by said vacuum pads 58 is fixedly secured to said lift plate 57 between said vacuum pads 58.

Figure 6:
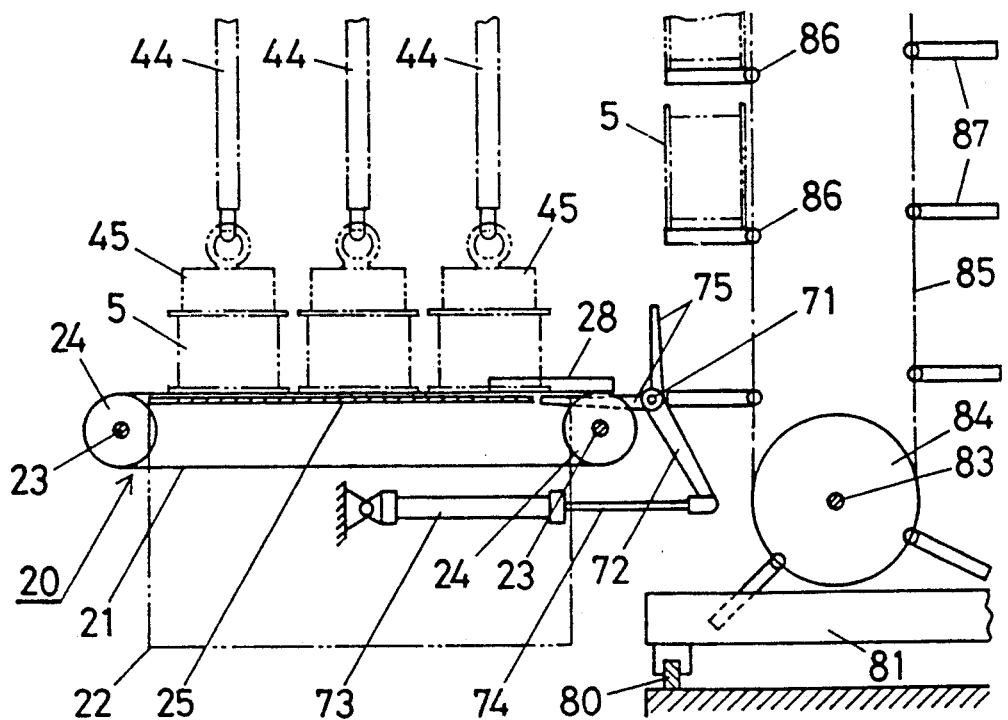
FIG. 6 is a longitudinal section view showing the second conveyer and the third carriage.
Figure 7:
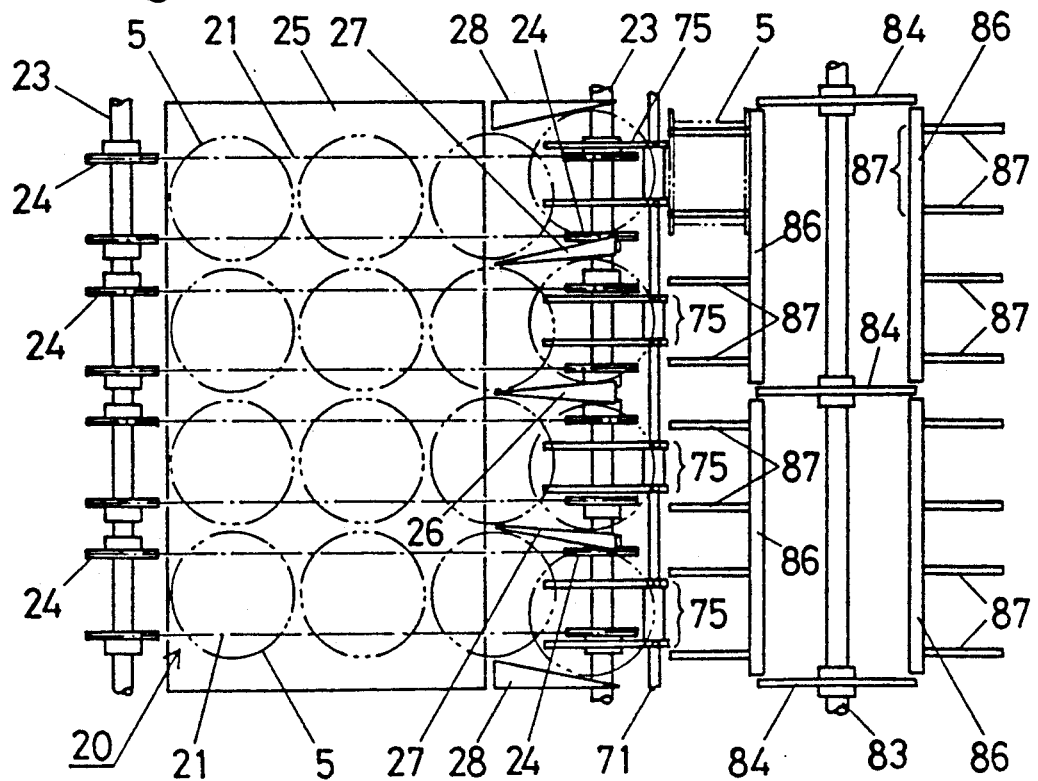
FIG. 7 is a plan view of FIG. 6.

As shown in FIGS. 6 and 7, said second conveyer 20 comprises 8 endless chains 21 which are thrown over sprockets 24, 24 mounted on conveyer shafts 23, 23 supported at the front and back of a rectangular frame 22 in such a manner that the reel 5 straddles over two adjacent endless chains 21, 21. The upper run of each of these endless chains 21 is supported by a chain support plate 25 fixed to the frames 22.

Fixedly secured to the frame 22 on the discharge side (the right-hand side in FIGS. 6 and 7) of said second conveyer 20 are total of five chain guides of 3 kinds, namely 26, 27 and 28. These chain guides are generally triangular in section view and are adapted to expand the clearance between the adjacent reels 5 closely arranged in 4 rows and 3 lines on the second conveyer 20 in association with the advance of the conveyor 20. The first chain guide 26 disposed in the center in the transverse direction of the conveyer 20 is adapted to keep the reels 5 in the central two rows separate from each other and the two second chain guides 27,27 disposed on both sides of said first chain guide 26 serve to keep separate the reels 5,5 in the two rows at left from each other and the reels in the two rows at right from each other, respectively. The two chain guides 28,28 situated at the right and left sides, respectively are adapted to contact the respective outer sides of reels 5,5 in the outermost rows to prevent them from rolling out of the conveyer 20.

As show in FIG. 6, there is provided a rotatable transfer rod 71 in parallel with said conveyer shaft 23 and forwardly of said chain guides 26, 27, 28 and this rotatable transfer rod 71 is supported by brackets (not shown) secured to said frames 22. Secured to one end of said rotatable transfer rod 71 is an arm 72 extending in a downward direction and the free end of this arm 72 is connected to a piston rod 74 of a fourth air cylinder 73 secured to said frame 22 and acting in the longitudinal direction of the conveyer. As this fourth air cylinder 73 is actuated, said rotatable transfer rod 71 is rotated through 90 degrees.

The rotatable transfer rod 71 carries, as fixed thereto, four L-shaped forks 75 in correspondence with the four reels 5 now aligned with increased clearances therebetween at the discharge end of the second conveyer 20 (FIG. 6). Each of said L-shaped forks 75 consists of a relatively short upwardly extending vertical portion and a relatively long rearwardly extending (to the left side in FIG. 6) horizontal portion, with each of the vertical and horizontal portions comprising two parallel bars. Therefore, as the reels are positioned at the discharge end of the second conveyer 20 and the piston rod 74 of the fourth air cylinder 73 is driven back to rotate said rotatable transfer rod 71 clockwise as shown in FIG. 6, the horizontal portions of the L-shaped forks 75 scoop the reels 5 and cause them to roll onto the vertical portions of the forks.

The reference numeral 76 in FIG. 1 represents this transfer mechanism comprising said rotatable transfer rod 71 and four L-forks 75. Disposed at the floor level forwardly of this transfer mechanism 76 is a ground track consisting of rails 80,80 which are in parallel with the first conveyer 10. A third carriage 81 is slidably mounted on the rails 80,80. This third carriage 81 has a pair of upright supporting posts 82,82, which are spanned by horizontal sprocket shafts 83 secured to said posts in the upper and lower positions thereof. Sprockets 84 are mounted rigidly on the upper and lower sprocket shafts in the front, intermediate and back positions thereof and an endless chain is thrown over each of 3 sprocket assemblies each consisting of the upper sprocket and the lower sprocket associated therewith.

Horizontal bars 86 are secured at equal pitches across the 3 vertical endless chains 85. Extending from each of these horizontal bars 86 are 4 fork assemblies each consisting of 2 bars disposed with a spacing somewhat broader than the spacing between the two bars constituting the L-shaped fork described hereinbefore. Let it be assumed that the reels 5 have been transferred to the L-shaped forks 75 and positioned on the normally vertical portions of the forks after clockwise rotation of the transfer rod 71 through 90 degrees as illustrated in FIG. 6. Then, as the endless chains 85 on the third carriage 81 are driven and each of said forks 87 passes through the corresponding one of said L-forks 75 on both sides, the reels 5 on the L-shaped forks 75 are transferred to the forks 87 of the third carriage 81.

Since, in the above arrangement, the first carriage 41 and second carriage 51 are connected tandem by the connecting rod 46, driving of the transmission chain 47 results in the simultaneous travel of the first carriage 41 and second carriage 51 so that as the first carriage 41 is shifted to the overhead position of the first conveyer 10, the second carriage 51 is brought into the overhead position of the third conveyer 30. As the packing case 1 is placed on one end of the first conveyer 10, the packing case 1 travels automatically along the centerline of the first conveyer 10 as the direction of its motion is restricted by the centering guide 13. As the packing case 1 arrives at the junction between the second and third conveyers 20, 30, the twelve first air cylinders 43 of the first carriage 41 are simultaneously actuated to project their piston rods 44 downward and the reel attracting means 45 comprising magnets attached to the lower ends of the piston rods are energized to hold the twelve reels 5 at one time. Then, the piston rods 44 are retracted to raise the reels 5.

Then, the first carriage 41 and the second carriage 51 are shifted to the overhead position of the second conveyer 20 and the overhead position of the first conveyer 10, respectively, and the reel attracting means 45 (magnets) of the first carriage 41 are lowered and, then, deenergized, whereupon the reels 5 are lowered on the second conveyer 20. On the other hand, the second air cylinder 53 of the second carriage 51 is actuated to project its piston rod 54 downward and let the separator attracting means 58 (vacuum pad) at its lower end hold the separator 2 in the packing case 1. Then, the reel attracting means 45 and separator attracting means 58 are raised.

Thereafter, the first carriage 41 and the second carriage 51 are brought back and the first carriage 41 is stopped in the overhead position of the first conveyer 10 and the second carriage 51 in the overhead position of the third conveyer 30. Then, the reel attracting means (magnets) 45 of the first carriage 41 are lowered to hold the reels 5 from the second stage in the same manner as described for the reels in first stage. On the other hand, the separator attracting means (vacuum pads) 58 of the second carriage 51 are lowered and the application of suction thereto is suspended. Instead, the pads 58 are supplied with air under pressure and the third air cylinders 60 are actuated to project their piston rods 61, thereby detaching the separator from the vacuum pads 58 and lower it on the third conveyer 30.

Then, in the same manner as above, the first carriage 41 and second carriage 51 are moved back and forth and the reel attracting means 45 and separator attracting means 58 are raised and lowered, whereby the reels 5 in the packing case 1 are transferred one stage after another to the second conveyer 20 while the separators 2 in the packing case 1 are transferred one after another to the third conveyer 30. The reels 5 transferred to the second conveyer 20 are conveyed to the discharge end, with the clearances between the four reels 5 in each line being somewhat expanded. Then, as the fourth air cylinder 73 is actuated, the rotatable transfer rod 71 is rotated and said four reels 5 are transferred from the second conveyer 20 to the L-shaped forks 75. Then, as the endless chains 85 on the third carriage 81 are driven, the four reels 5 are transferred from the L-shaped forks 75 to the forks 87 of the third carriage 81.

The reels 5 on the third carriage 81 can be simply dislodged from the forks 87 by pushing them lightly from the back (the right-hand side in FIG. 1). Therefore, by providing a reel transport car equipped with pegs arranged at the same pitch as the forks 87 of the third carriage 81, the reels 5 can be easily transferred from the third carriage 81 to the reel transport car.

What is claimed is:

1. An apparatus for withdrawing reels from a packing case containing a plurality of reels in plural rows and lines and in a plurality of stages with separators each interposed between adjacent stages, which comprises a first conveyer adapted to convey said packing case in a horizontal direction, a second conveyer for conveying said reels as disposed on one side of said first conveyer and at right angles therewith, a third conveyer for conveying said separators as disposed on a side of said first conveyer which is opposite to said second conveyer, overhead rails disposed over and between said second conveyer and said third conveyer, a first carriage adapted to travel back and forth along said overhead rails between respective overhead positions of said first conveyer and second conveyer, reel attracting means suspended from said first carriage and free to ascend and descend, a second carriage adapted to travel back and forth along said rails between the respective overhead positions of said first conveyer and third conveyer, and a separator attracting means suspended from said second carriage and free to ascend and descend.

* * * * *